April 29, 1947. G. P. FLOYD 2,419,714
RINGLESS SELF EXPANDING PISTON
Filed Feb. 19, 1945 2 Sheets-Sheet 1
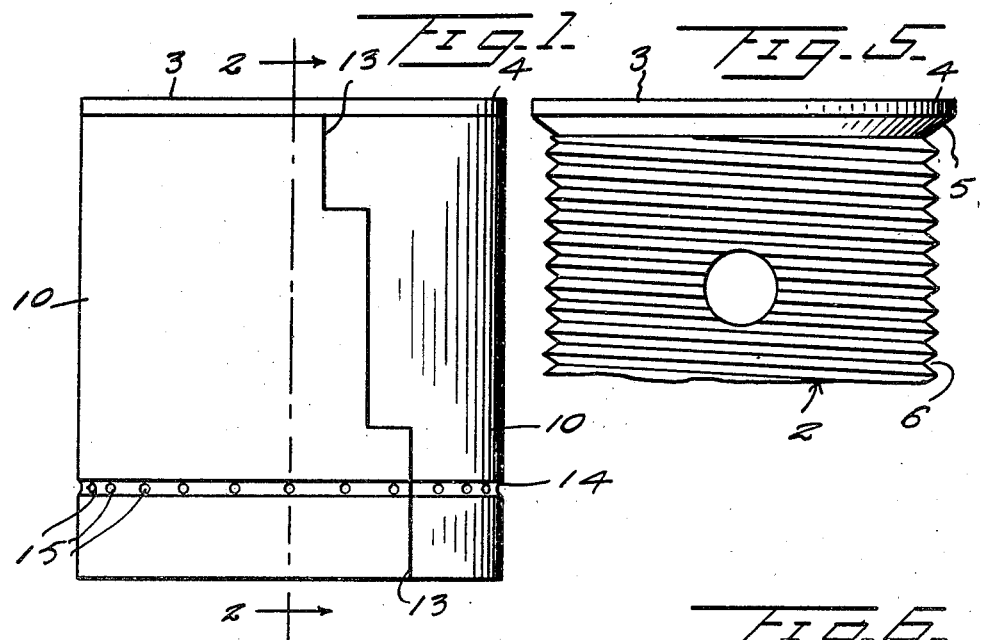
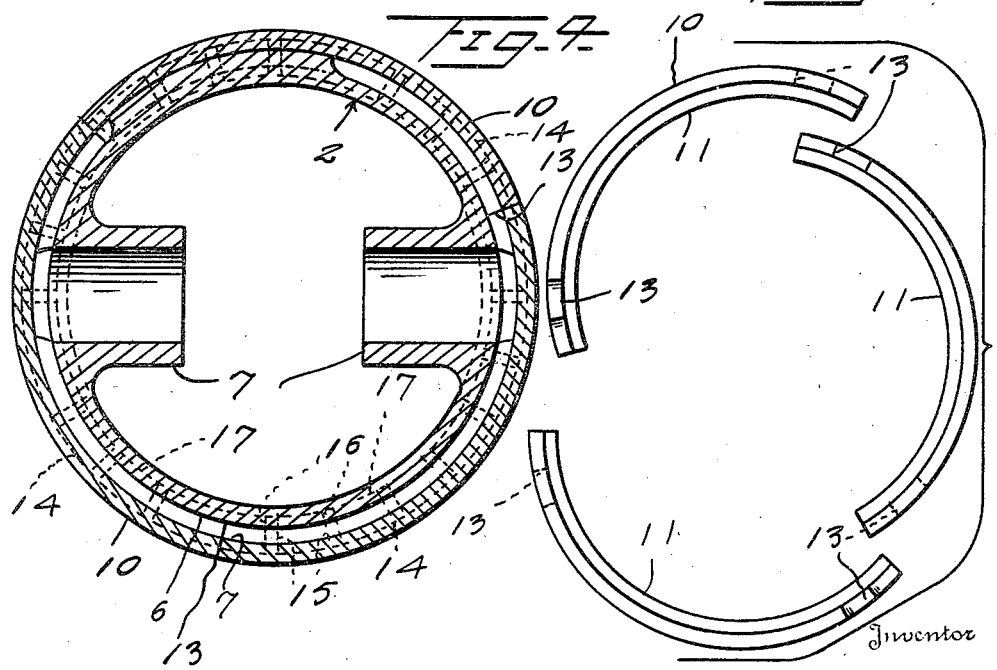
Inventor
G. P. Floyd
By Randolph & Beavers
Attorneys April 29, 1947. G. P. FLOYD 2,419,714
RINGLESS SELF EXPANDING PISTON
Filed Feb. 19, 1945 2 Sheets-Sheet 2
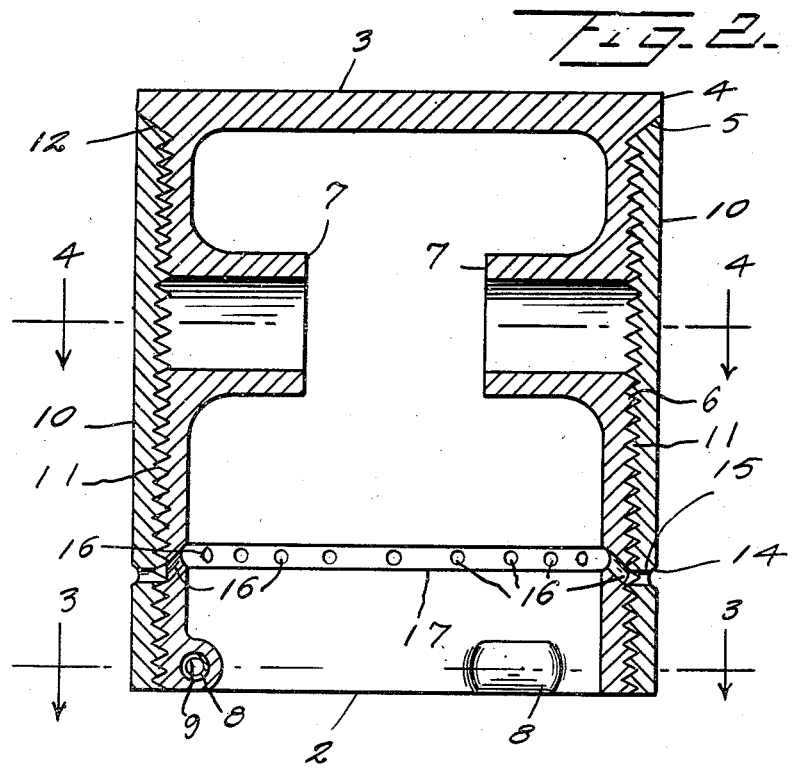
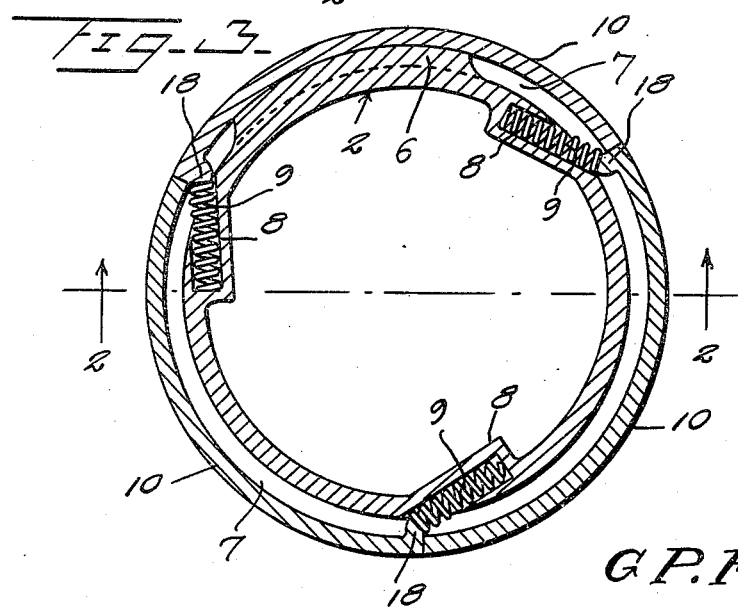
Inventor
G. P. Floyd
By Randolph & Beavers
Attorneys Patented Apr. 29, 1947

2,419,714

UNITED STATES PATENT OFFICE 2,419,714

RINGLESS SELF-EXPANDING PISTON

George P. Floyd, Akron, Ohio, assignor to Floyd Research and Development Co., Akron, Ohio, a corporation of Ohio Application February 19, 1945, Serial No. 578,602

2 Claims. (Cl. 309—12)

The present invention relates to a ringless self-expanding piston comprising a body and a plurality of shells which as a whole surround the body and are pressed outwardly by springs seated in the body and thus expand taking up the wear and preventing piston slap.

The cylinders of engines become worn, wavy and out of true due to the wearing of the cylinder wall so that the ordinary piston ring will not conform to the inner faces of said cylinder; thus leakage of gases, oil and liquids pass the piston ring and impair the efficiency of the engine.

The object of my invention is to effectively cure piston slap, compression loss, vibration, oil pumping, gas waste and like troubles.

It is a further object of the invention to provide a piston which possesses advantages in points of simplicity and efficiency and at the same time proves itself comparatively inexpensive in cost of manufacture.

In the drawings:

Figure 1 is a side view of the piston;

Figure 2 is an enlarged longitudinal section on line 2—2 of Figure 1 or Figure 3;

Figure 3 is a transverse section on line 3—3 of Figure 2;

Figure 4 is a transverse section on line 4—4 of Figure 2;

Figure 5 is a side view of the upper portion of the piston body the lower portion of which is broken away;

Figure 6 is a top plan view of the shell sections taken apart.

In the drawings in which like numerals denote like or similar parts numeral 2 denotes a hollow body of generally cylindrical shape with a top 3 projecting somewhat beyond the cylindrical surface and forming thereby a flange 4 which is beveled (5) at its lower edge. The body is exteriorly threaded (6) throughout and is provided in its interior with two radially extending piston pin bosses 7 in the form of tubes, open at both ends and the inner ends spaced somewhat less than the inner radius of the body.

Near the lower end of the body is provided with three chordal recesses 8 each of which houses the major portion of a spring 9 bearing with its inner end against the bottom of the recess.

The body is surrounded by three cylindrical sections 10 with interior threads 11 engaging the exterior threads of the body and each section is interiorly beveled (12) at its open upper end for engagement with the bevel on the top flange. The longitudinal edge of each section forms a lap joint 13 with the adjacent section owing to the fact that the edge forms a series of steps.

The sections are provided with external oil grooves 14 lying in a plane at right angles to the axis of the piston. These grooves communicate with one another and with radial oil holes 15 in the section which register with inclined radial holes 16 in the body. The last named holes communicate with a groove 17 formed on the inner side of the body wall and cause lubricating oil to flow radially outward between the outer surface of the sections and the cylinder wall.

Each of the sections is provided upon its interior surface and near its lower end with a lug 18 which serves as an abutment for the outer end of one of the springs described.

While I have described and shown three shell sections each having a single lug for engagement with a spring mounted in the body, I desire it understood that I do not limit myself to a particular number of shell sections, lugs or springs.

The piston is machined to a sliding fit in the cylinder. The springs are inserted in their sockets 8; then the shell sections are placed around them and turned back and placed in the cylinder.

The springs are mounted in such a position in the body that they not only urge the shell sections away from the body and against the cylinder wall, but also urge the shell sections around the axis of the body. The threads on the sections and body cause the former to advance axially while urged around the body. Thus the bevel surfaces on the sections are forced against the bevel surface on the body and make this joint gas and oil tight. The lap joint between the sections is also oil and gas tight. Any wear between the sections and the cylinder is taken up by the springs.

From the foregoing description it is thought to be obvious that a piston constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

Having thus described my invention, what I claim and desire to secure by Letters Patent is:

1. A piston comprising an inner body having a top flange with an outward bevel on its bottom edge, a plurality of shell sections as a whole surrounding the body and each beveled at the top edge for cooperation with the first recited bevel, springs seated in the body and having a radial and circumferential force component, lugs on the inner surface of the sections and each cooperating with a spring for forcing the sections outwardly and circumferentially, and means on the body and sections for forcing the latter upward and the two bevels into engagement.

2. In a piston assembly comprising an inner intact body having a head portion, an outer body divided into vertical sections, said inner body being provided with chordally disposed sockets, each of said sections being provided with abutment, compression springs disposed in the socket and chordally disposed to engage and press against the said abutments to expand the said sections.

GEORGE P. FLOYD.

REFERENCES CITED

The following references are of record in the file of this patent:

UNITED STATES PATENTS

| Number | Name | Date |
|---|---|---|
| 1,754,404 | Sanford | Apr. 15, 1930 |
| 1,402,679 | Somes et al. | Jan. 3, 1922 |
| 1,753,113 | Floyd | Apr. 1, 1930 |
| 2,201,085 | Girard | May 14, 1940 |
| 1,427,930 | Baker | Sept. 5, 1922 |